(12) United States Patent
Fujita et al.

(10) Patent No.: US 7,155,984 B2
(45) Date of Patent: Jan. 2, 2007

(54) ROTATIONAL SENSOR

(75) Inventors: Noriaki Fujita, Aichi-ken (JP);
Kazuyoshi Tsuruta, Okazaki (JP);
Toshiyuki Matsuo, Takahama (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 11/134,382

(22) Filed: May 23, 2005

(65) Prior Publication Data

US 2005/0268732 A1    Dec. 8, 2005

(30) Foreign Application Priority Data

May 27, 2004    (JP) ............................. 2004-157176

(51) Int. Cl.
*G01L 3/00*    (2006.01)
(52) U.S. Cl. .................................. 73/862.08
(58) Field of Classification Search ............. 73/862.08
See application file for complete search history.

(56) References Cited

U.S. PATENT DOCUMENTS

| | | | | |
|---|---|---|---|---|
| 5,963,124 A | * | 10/1999 | Buss et al. | 338/162 |
| 5,998,892 A | * | 12/1999 | Smith et al. | 310/68 B |
| 6,291,914 B1 | * | 9/2001 | Mukaiyama | 310/68 B |
| 6,362,719 B1 | * | 3/2002 | Osmer et al. | 338/2 |
| 6,427,316 B1 | * | 8/2002 | Shinjo et al. | 29/602.1 |
| 6,715,368 B1 | * | 4/2004 | Toratani et al. | 73/862.325 |
| 6,737,863 B1 | * | 5/2004 | Aoki et al. | 324/207.25 |
| 6,779,389 B1 | * | 8/2004 | Kubota et al. | 73/118.1 |

FOREIGN PATENT DOCUMENTS

| | | |
|---|---|---|
| DE | 44 18 569 A1 | 5/1994 |
| EP | 0 727 647 A1 | 2/1996 |
| EP | 0 884 565 A1 | 6/1998 |
| JP | 6-82478 | 9/1992 |

OTHER PUBLICATIONS

European Search Report dated Sep. 26, 2005.

* cited by examiner

*Primary Examiner*—Michael Cygan
*Assistant Examiner*—Octavia Davis
(74) *Attorney, Agent, or Firm*—Reed Smith LLP; Stanley P. Fisher, Esq.; Juan Carlos A. Marquez, Esq.

(57) ABSTRACT

A rotational sensor includes a detection element accommodated in a case and detecting a rotational motion of a rotor located outside the case to output a rotational signal, a terminal physically and electrically connected to the detection element, a connecting member electrically connected to the terminal to output the rotational signal from the terminal outside the rotational sensor and an elastic body fitted into the case by press-fitting and through which the terminal is inserted.

19 Claims, 3 Drawing Sheets

ROTATIONAL SENSOR

CROSS REFERENCE TO RELATED APPLICATIONS

This application is based on and claims priority under 35 U.S.C. § 119 to Japanese Patent Application 2004-157176, filed on May 27, 2004, the entire content of which is incorporated herein by reference.

FIELD OF THE INVENTION

The present invention generally relates to a rotational sensor.

BACKGROUND

JPH6-82478A describes a conventional rotational sensor. The conventional rotational sensor will be explained with reference to FIG. 5. Generally, for example, a rotational sensor is provided so as to face a rotor 1 rotating with a wheel of a vehicle. When the rotor 1 of a magnetic body rotates, magnetic flux density passing a Hall IC 2 (detection element) changes because of protruding portions and recessed portions of a gear of the rotor 1. These changes of magnetic flux density are detected by the Hall IC 2. Thus, a rotational speed of the rotor 1 is detected, and the rotational sensor functions as a vehicle speed sensor.

In the rotational sensor, a holder 3 of a cylindrical shape is formed into a single member with a terminal 4 by means of resin molding. One end 4a of the terminal 4 penetrating the holder 3 is electrically connected to the Hall IC 2 through a terminal 6 provided at a base plate 5. In addition, the other end 4b of the terminal 4 penetrating the holder 3 is electrically connected to a core wire of a cable 7. Then, after the holder 3 is fitted into a case 8 of a cylindrical shape, a seal member 9 of a cap shape is formed by means of resin molding, and the case 8 and the holder 3 are tightly sealed so as to inhibit infiltration of liquid. In this case, also the terminal 4 and the cable 7 connected to the terminal 4 are formed into a single member by means of molding. In other words, the terminal 4 electrically connected to the Hall IC 2 is embedded in the holder 3 and the seal member 9.

In the rotational sensor described above, the case 8 and the holder 3 are sealed by the seal member 9. In addition, the terminal 4 is embedded in the holder 3 and the seal member 9. Thus, part where the Hall IC 2 is provided can be tightly covered.

However, because of differences between materials, there exist differences between a coefficient of thermal expansion of the holder 3 and that of the terminal 4, and between that of the seal member 9 and that of the terminal 4. Accordingly, when the rotational sensor is utilized in periodic temperature condition in which surrounding temperature repeatedly rises and declines, though depending on differences in levels of expansion and contraction, there is a danger of forming a gap between the holder 3 and the terminal 4, and between the seal member 9 and the terminal 4.

In this case, there is a danger that moisture, oil, or the like, infiltrated from outside the sensor along a core wire of the cable 7, reach the part where the Hall IC 2 is provided through the gap. Such infiltration of moisture or oil tends to cause electric corrosion or short circuit between terminals of the Hall IC 2, which degrades property of the Hall IC 2, and thereby degrading performance of the rotational sensor.

A need thus exists for a rotational sensor which can ensure performance thereof by firmly inhibiting infiltration of moisture or oil into part where a detection element is provided even when utilized in periodical temperature condition. The present invention has been made in view of the above circumstances and provides such a rotational sensor.

SUMMARY OF THE INVENTION

According to an aspect of the present invention, a rotational sensor includes a detection element accommodated in a case, a terminal electrically connected to the detection element, and an elastic body fitted into the case by means of press fit and through which the terminal is inserted.

According to a further aspect of the present invention, a rotational sensor includes a case having an opening at least at one end of the case, a detection element accommodated in the case and detecting motion of a rotor rotating outside the case, an electrically conductive terminal connected to the detection element and extended outside the case, a cover member for covering the opening of the case and through which the electrically conductive terminal penetrates, and an elastic body provided inside the opening of the case and though which the electrically conductive terminal penetrates and making contact with the inside the opening of the case and the cover member with pressure.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
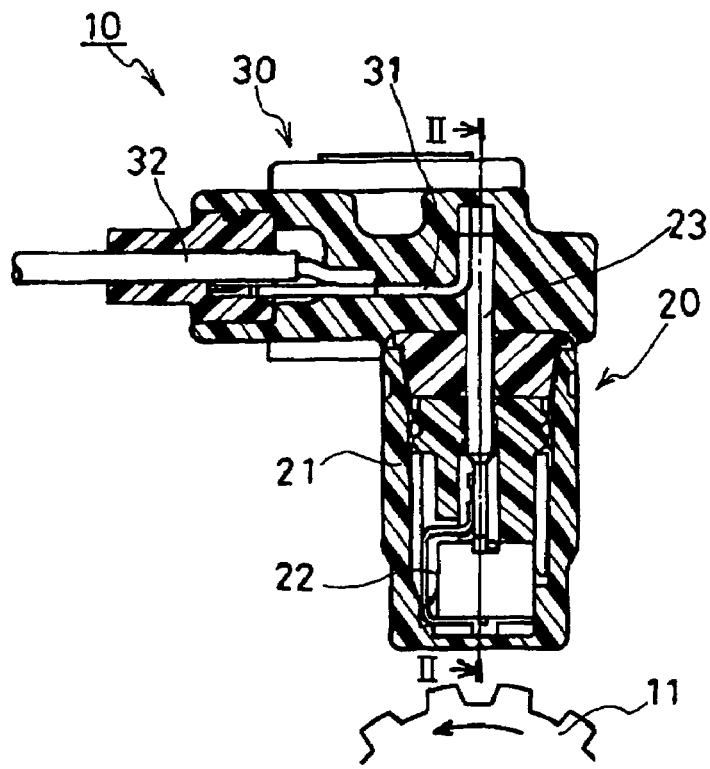
FIG. 1 represents a configuration of a rotational sensor according to an embodiment of the present invention.

An embodiment of the present invention will be explained with reference to drawing figures. FIG. 1 represents a configuration of a rotational sensor 10 according to the embodiment of the present invention. In this embodiment, an example of a rotational sensor 10 applied to a vehicle speed sensor for detecting rotational speed of a rotor 11 rotating with a wheel of a vehicle will be explained.

A rotational sensor 10 includes a sensor body 20 and a mold portion 30. The sensor body 20 is provided so as to face a rotor 11 of a magnetic body. When the rotor 11 rotates, the rotation of the rotor 11 is detected by a Hall IC 22 serving as a detection element accommodated in a case 21 of the sensor body 20. Then, signals detected by the sensor body 20 are transmitted to terminals 31 made of electrical conductor embedded in the mold portion 30 through terminals (electrically conductive terminal) 23 made of electrical conductor. Core wires of cables 32 are connected to the terminals 31 by means of welding, or the like. The cables 32 are connected to a controller (not shown).

Figure 2:
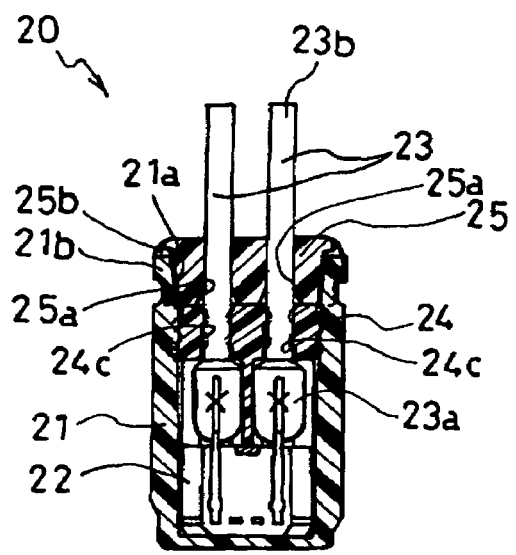
FIG. 2 represents a cross-sectional view taken on line II—II of FIG. 1.

In following, the sensor body 20 will be explained with reference to FIG. 2. FIG. 2 represents a cross-sectional view taken on line II—II of FIG. 1. The sensor body 20 includes the case 21, the Hall IC 22, the terminals 23, a holder 24 serving as an elastic body, and a plate 25 serving as a cover member.

The case 21 is made of resin. The case 21 has an approximately cylindrical shape with a bottom. A plurality of pawl portions 21b (only one of the pawl portions is numbered in FIG. 2) is provided at an opening portion 21a of the case 21.

The Hall IC 22 (detection element) is accommodated in the case 21. The Hall IC 22 is a conventional magnetic detection element emitting signals corresponding to passing magnetic flux density. In addition, a not shown magnet is accommodated in the Hall IC 22.

Each of two terminals 23 provided has an approximately column shape. One end 23a of each terminal 23 is electrically connected to the Hall IC 22 by means of welding, or the like. The other end 23b of each terminal 23 is extended outside the opening portion 21a of the case 21 (upward direction in the figure). The other end 23b of each terminal 23 is electrically connected to each terminal 31 described above (please refer to FIG. 1) by means of welding, or the like.

Figure 3:
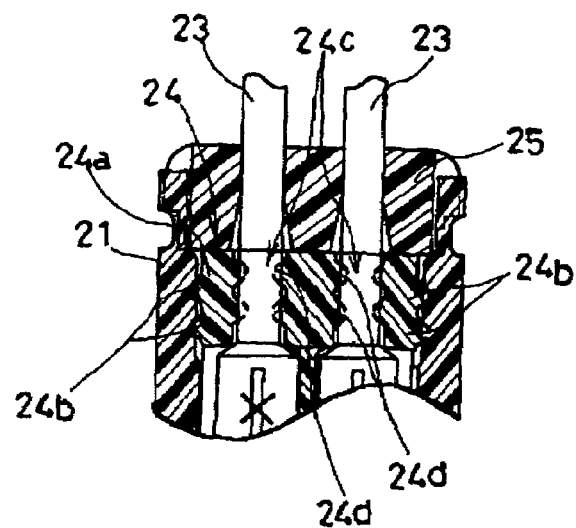
FIG. 3 represents a partially enlarged view of FIG. 2 illustrating a holder and surroundings thereof.

The holder 24 (elastic body) is made of rubber. However, material of the holder 24 is not limited to rubber. Another material, having elasticity, can be utilized for material of the holder 24. The holder 24 has an approximately cylindrical shape. The holder 24 is fitted into the case 21 by means of press fit. Each terminal 23 is inserted into the holder 24 by means of press fit. In other words, each terminal 23 penetrates through the holder 24. In following, details in configuration of the holder 24 will be explained with reference to FIG. 3. FIG. 3 represents a partially enlarged view of FIG. 2 illustrating the holder 24 and surroundings thereof.

A base portion 24a of the holder 24 is fitted into the case 21 by means of press fit. A seal portion 24b is provided along a periphery of the base portion 24a. The seal portion 24b is provided over the periphery of the base portion 24a so as to protrude in a radial direction, in other words, the seal portion 24b has a lip-like shape. The base portion 24a of the holder 24 is fitted into the case 21 in a condition that the seal portion 24b elastically deforms in relation to a radial direction. In other words, a shape of the seal portion 24b including a press fit margin (corresponding to size of elastic deformation) is set so that the base portion 24a of the holder 24 is fitted into the case 21 by means of press fit. In this case, a maximum outer diameter of the holder 24 is formed to be larger than an inner diameter of the case 21 in appearance.

In addition, two insert holes 24c are provided at the base portion 24a so as to penetrate the base portion 24a in an axial direction of the base portion 24a. Each terminal 23 is inserted through each insert hole 24c by means of press fit. In other words, each terminal 23 penetrates through each insert hole 24c. A seal portion 24d is provided at an inner periphery of each insert hole 24c. Each seal portion 24d is provided over the inner periphery of each insert hole 24c so as to protrude inward diametrical direction of the each insert hole 24c, in other words, each seal portion 24d has a lip-like shape. Each terminal 23 is inserted through each insert hole 24c of the holder 24 in a condition that each seal portion 24d elastically deforms in relation to a diametrical direction. In other words, a shape of each seal portion 24d including a press fit margin (corresponding to a size of elastic deformation) is set so that each terminal 23 is fitted through each insert hole 24c of the holder 24 by means of press fit. In this case, an inner diameter of each insert hole 24c of the holder 24 is smaller than an outer diameter of each terminal 23 in appearance.

The plate 25 (cover member) has an approximately disk shape. As illustrated in FIG. 2, two insert holes 25a are provided at the plate 25 so as to correspond to the insert holes 24c of the holder 24. Each terminal 23 is inserted through each insert hole 25a. In other words, each terminal 23 penetrates through each insert hole 25a. In addition, a plurality of engaging portions 25b (only one of the engaging portions is numbered in FIG. 2) are provided at an outer periphery of the plate 25 so as to correspond to the pawl portions 21b of the case 21. When the engaging portions 25b are engaged with the pawl portions 21b of the opening portion 21a of the case 21, the opening portion 21a of the case 21 is covered by the plate 25. In this case, the holder 24 is provided between the Hall IC 22 and the plate 25 in a condition that the holder 24 elastically deforms in relation to an axial direction. In other words, the plate 25 presses the Hall IC 22 through the holder 24. In addition, a dimension of the holder 24 in an axis direction including a press fit margin (corresponding to a size of elastic deformation) is set so that the holder 24 is provided between the Hall element IC 22 and the plate 25 with elastic force.

In following, assembly of the sensor body 20 including members described above will be explained. First, the Hall IC 22 is electrically connected to one end 23a of each terminal 23 by means of welding or the like. Next, each terminal 23 connected to the Hall IC 22 is inserted through each insert hole 24c provided at the base portion 24a of the holder 24 by means of press fit. Next, the members described above assembled are accommodated in the case 21. Then, the plate 25 is fitted to the opening portion 21a of the case 21 so as to cover the members described above. Thus, assembly of the sensor body 20 is completed.

In addition, when conditions of surroundings required for use is not so strict, the holder 24 and each terminal 23 can be assembled together by means of just inserting, not by means of press fit. Similarly, the holder 24 and the case 21 can be assembled together by means of just inserting, not by means of press fit. In this case, the sensor body 20 can be configured so that, when the plate 25 is assembled with the case 21, the holder 24 of an elastic body expands in a diametric direction, and thus the holder 24 makes contact with each terminal 23 and the case 21 with pressure.

After assembly of the sensor body 20 is completed, the mold portion 30 for the case 21 is formed on the plate 25 by means of resin molding (Please refer to FIG. 1). In other words, the opening portion 21a of the case 21 is sealed by the mold portion 30 through the plate 25. In addition, in this process of resin molding, each terminal 23, each terminal 31 connected to each terminal 23, and each cable 32 connected to each terminal 31 are formed as a single member. Thus, the terminals 23 and the terminals 31 are embedded in the mold portion 30.

Figure 4A:
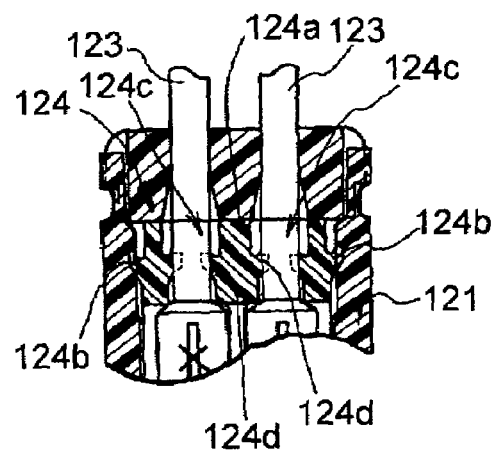
FIG. 4A represents another embodiment of the holder illustrated in FIG. 2.
Figure 4B:
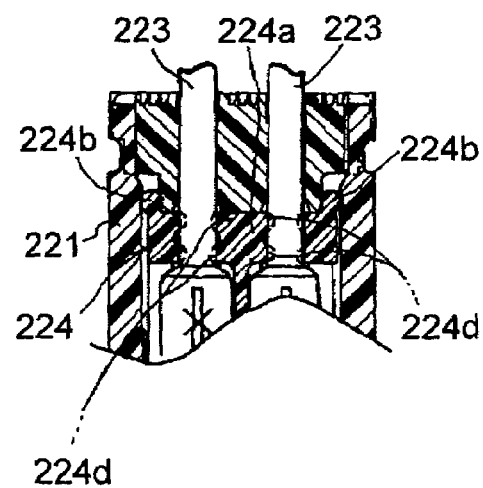
FIG. 4B represents another embodiment of the holder illustrated in FIG. 2.
Figure 5:
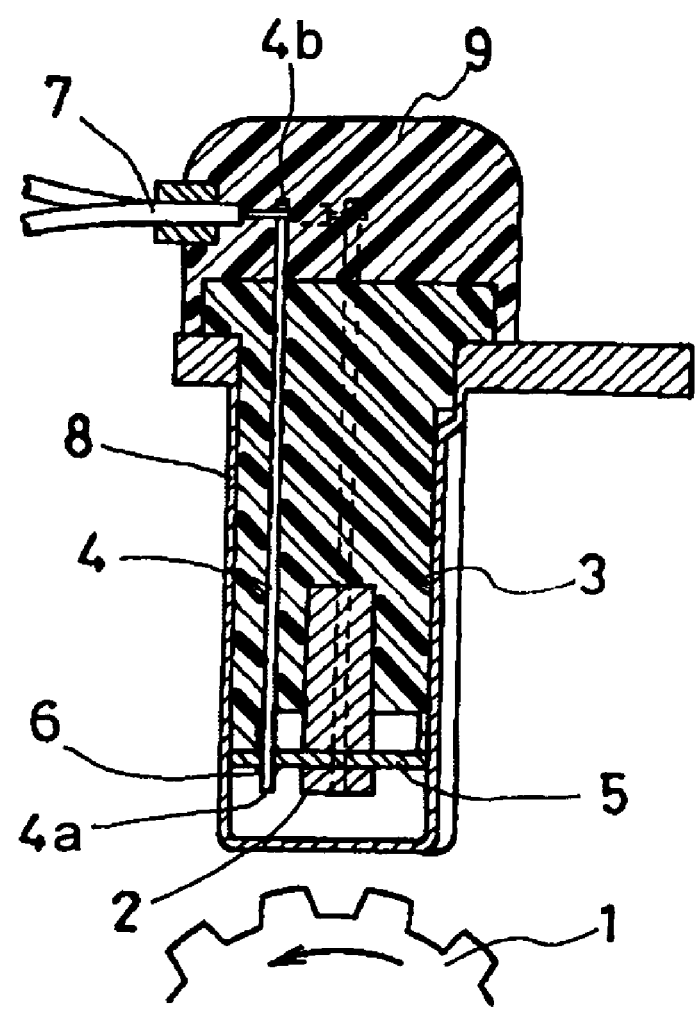
FIG. 5 represents a conventional rotational sensor.

In addition, a shape of each seal portion 24b, 24d provided at the holder 24 is not limited to one described above. For example, considering easiness of assembling the holder 24 with each terminal 23 and the case 21, or the like, a shape illustrated in FIGS. 4A and 4B is applicable. In the case illustrated in FIG. 4A, each seal portion 124b and 124d of the holder 124 is so called self-seal shape. Accordingly, the base portion 124a of the holder 124 can be easily fitted into the case 121 by means of press fit. Furthermore, each terminal 123 can be easily inserted through each insert hole 124c by means of press fit.

In addition, in the case illustrated in FIG. 4B, the base portion 224a of the holder 224 is divided into two areas in an axial direction so as to separately provide the seal portion 224b and the seal portion 224d in respective areas described above. In this configuration, although the base portion 224a deforms in a radial direction thereof in the process of press fit of each terminal 223, this deformation (expansion in outer diameter) does not tend to influence the seal portion 224b to be fitted to the case 221 by means of press fit. Accordingly, when the terminals 223 are inserted and therefore the holder 224 deforms, it can be prevented that a size of the press fit margin of the base portion 224a of the holder 224 to the case 221 become excessively large. Thus, easiness of assembly of the holder 224 with the case 221 can improve.

In following, an example in which the rotational sensor 10 is applied to a vehicle speed sensor will be explained. As illustrated in FIG. 1, for example, the rotational sensor 10 is provided so that the case 21 faces the rotor 11 rotating with a wheel of the vehicle. When the rotor 11 of a magnetic body rotates, because of protruding portions and recessed portions of a gear provided outer periphery of the rotor 11, magnetic flux density passing through the Hall IC 22 accommodated in the case 21 changes. Changes of the magnetic flux density are detected by the Hall IC 22. Then, signals detected by the Hall IC 22 are transmitted to a controller (not shown) through the terminals 23, the terminals 31, and the cables 32. Accordingly, rotational speed of the rotor 11 is detected, and the rotational sensor 10 functions as a vehicle speed sensor.

In addition, the rotational sensor 10 according to the embodiment of the present invention is applicable to a gear sensor for detecting rotation of a gear in a transmission of a vehicle. In this case, the gear, which is an object of detection, corresponds to the rotor 11 according to the embodiment of the present invention.

As described above, in the rotational sensor 10 according to the embodiment of the present invention, the Hall IC 22 is accommodated in the approximately cylindrical case 21, and the approximately cylindrical holder 24 is fitted into the case 21 by means of press fit. Then, the terminals 23 electrically connected to the Hall IC 22 are inserted into the holder 24 by means of press fit. In this case, the holder 24 makes contact with the case 21 and the terminals 23 with pressure in a condition that the holder 24 elastically deforms. In other words, the holder 24 makes contact with the case 21 and the terminals 23 with pressure through a predetermined press fit margin of the holder 24. Accordingly, by setting the press fit margin in consideration of thermal expansion under periodic temperature condition, even in the periodic temperature condition, because of elastic force of the holder 24, part of the case 21 in which the Hall IC 22 is provided can be tightly sealed. As a result, infiltration of moisture or oil from outside the case 21 (for example, infiltration through a gap formed between the terminal 23 and the mold portion 30 under periodic temperature condition) can be firmly prevented, which can ensure performance of the rotational sensor 10.

In addition, the plate 25 covering the opening 21a of the case 21 presses the Hall IC 22 through the holder 24. In other words, the holder 24 is provided between the Hall IC 22 and the plate 25 in a condition that the holder 24 elastically deforms in relation to an axial direction of the holder 24. Accordingly, a position of the Hall IC 22 in relation to an axial direction of the case 21 is restricted by elastic force of the holder 24. Thus, the Hall IC 22 can be held to the case 21 in a condition that the Hall IC 22 is isolated from vibration. As a result, deterioration of the Hall IC 22 or degradation of detection performance of the Hall IC 22, caused by vibration or the like, can be prevented.

In addition, the mold portion 30 is formed on the plate 25 for the case 21 by means of resin molding. In this case, the plate 25 is engaged with the opening 21a of the case 21 through the engaging portion 25b. Therefore, pressure induced in the process for forming the mold portion 30 by means of resin molding is supported by the plate 25, and the pressure for forming does not applied to inside the case 21. Accordingly, it can be prevented that the pressure for forming be applied to the Hall IC 22 accommodated in the case 21. As a result, deterioration or damages of the Hall IC 22 caused by effects of the pressure induced in the process of resin molding can be prevented.

In addition, because a cross-sectional shape of each terminal 23 inserted into the holder 24 by means of press fit is circular, comparing with a terminal having an angular cross-sectional shape, elastic force of the holder 24 can be uniformly applied to each terminal 23 in an orthogonal direction relative to a tangent of curved surface of the terminal 23 (in an inward diametrical direction of each terminal 23), which can ensure high level of sealing property. In addition, because the terminals 23 does not have corners, possibility of damages of the holder 24 caused by such corners, which can occur in the case that a terminal having an angular cross-sectional shape is inserted into the holder 24 by means of press fit, can be ruled out.

According to an aspect of the present invention, a rotational sensor includes a detection element accommodated in a case, a terminal electrically connected to the detection element, and an elastic body fitted into the case by means of press fit and through which the terminal is inserted.

According to a further aspect of the present invention, it is preferable that the rotational sensor further include a cover member for covering an opening of the case and pressing the detection element through the elastic body.

According to a further aspect of the present invention, it is preferable that the cover member include an engaging portion for engaging with the opening of the case.

According to a further aspect of the present invention, it is preferable that a mold portion be formed by means of resin molding on the cover member for sealing the opening of the case.

According to a further aspect of the present invention, it is preferable that the terminal have an approximately column shape.

According to a further aspect of the present invention, a rotational sensor includes a case having an opening at least at one end of the case, a detection element accommodated in the case and detecting motion of a rotor rotating outside the case, an electrically conductive terminal connected to the detection element and extended outside the case, a cover member for covering the opening of the case and through which the electrically conductive terminal penetrates, and an elastic body provided inside the opening of the case and through which the electrically conductive terminal penetrates and making contact with the inside the opening of the case and the cover member with pressure.

According to a further aspect of the present invention, it is preferable that the elastic body make contact with the inside the opening of the case, the detection element, and the cover member with pressure.

According to a further aspect of the present invention, it is preferable that the elastic body make contact with the inside the opening of the case, the detection element, the cover member, and the electrically conductive terminal with pressure.

According to a further aspect of the present invention, it is preferable that the electrically conductive terminal have an approximately column shape.

According to a further aspect of the present invention, it is preferable that the rotational sensor further include a mold portion formed by means of resin molding for covering the opening of the case.

According to a further aspect of the present invention, a detection element is accommodated in a case, and an elastic body is provided in the case. A terminal electrically connected to the detection element is inserted through the elastic body. In this case, the elastic body makes contact with the case and the terminal in a condition that the elastic body elastically deforms. Accordingly, by setting a size of elastic deformation with consideration of thermal expansion under periodic temperature condition, even when the rotational sensor is utilized under the periodic temperature condition, because of elasticity of the elastic body, part of the case where the detection element is provided can be tightly sealed. As a result, infiltration of moisture or oil into the part where the detection element is provided can be firmly prevented, which can ensure performance of the rotational sensor.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotational sensor comprising:
   a case having an approximately cylindrical shape and an opening portion;
   a detection element accommodated in the case and detecting a rotational motion of a rotor located outside the case to output a rotational signal;
   a cover member press-fitted into the opening portion to cover the case, said cover member having a first insert hole;
   a terminal electrically connected to the detection element and penetrating through the first insert hole; and
   an elastic body having a second insert hole through which the terminal is inserted, the elastic body being press-fitted into the case and provided between the detection element and the cover member.

2. The rotational sensor according to claim 1, wherein the cover member includes an engaging portion for engaging with the opening of the case.

3. The rotational sensor according to claim 1, wherein a mold portion is formed by means of resin molding on the cover member for sealing the opening of the case.

4. The rotational sensor according to claim 1, wherein the terminal has an approximately column shape.

5. A rotational sensor comprising:
   a case having an opening portion at at least one end of the case;
   a detection element accommodated in the case and detecting a rotational motion of a rotor of a magnetic body located outside the case to output a rotational signal;
   an electrically conductive terminal connected to the detection element and extended outside the case;
   a connecting member physically and electrically connected to the electrically conductive terminal to output the rotational signal from the electrically conductive terminal outside the rotational sensor;
   a cover member press-fitted into the opening portion to cover the case, said cover member having a first insert hole through which the electrically conductive terminal penetrates; and
   an elastic body provided inside the case and through which the electrically conductive terminal penetrates and making contact with an inner face of the case and an inner face of the cover member with pressure.

6. The rotational sensor according to claim 5, wherein the elastic body further makes contact with the detection element with pressure.

7. The rotational sensor according to claim 5, wherein the elastic body further makes contact with the detection element and the electrically conductive terminal with pressure.

8. The rotational sensor according to claim 5, wherein the electrically conductive terminal has an approximately column shape.

9. The rotational sensor according to claim 5, further comprising: a mold portion formed by means of resin molding for covering the opening of the case.

10. A rotational sensor comprising:
    a case having an opening portion at one end thereof and a bottom portion at the other end thereof;
    a detection element accommodated in the case for detecting a rotational motion of a rotor of a magnetic body located outside the case to output a rotational signal;
    an electrically conductive terminal connected to the detection element and extended outside the case;
    a cover member press-fitted into the opening portion to cover the case, and through a first insert of the cover member the electrically conductive terminal penetrating; and
    an elastic body press-fitted into the opening portion of the case, and through a second insert hole of the elastic body the electrically conductive terminal penetrating, and the elastic body provided between the cover member and the detection element to elastically deform therebetween so as to press the detection element toward the bottom portion of the case.

11. The rotational sensor according to claim 10, wherein the electrically conductive terminal is inserted into the elastic body by means of press fit.

12. The rotational sensor according to claim 1, further comprising a cover member for covering an opening or the case and wherein the elastic body is provided between the cover member and the detection element to elastically deform therebetween.

13. The rotational sensor according to claim 1, wherein the terminal is inserted into the elastic body by means of press fit.

14. The rotational sensor according to claim 1, wherein the connecting member outputs the rotational signal transmitted to the terminal to a controller.

15. The rotational sensor according to claim 5, wherein the elastic body is provided between the cover member and the detection element to elastically deform therebetween.

16. The rotational sensor according to claim 5, wherein the electrically conductive terminal is inserted into the elastic body by means of press fit.

17. The rotational sensor according to claim 1, wherein the connecting member outputs the rotational signal transmitted to the electrically conductive terminal to a controller.

18. The rotational sensor according to claim 10, wherein the elastic member includes a base portion and a seal portion provided along a periphery of the base portion so as to protrude in a radial direction, when the base portion is fitted into the case, the seal portion elastically deforms in the radial direction.

19. The rotational sensor according to claim 10, wherein the elastic member includes a seal portion provided at the inner periphery of the second insert hole so as to protrude in a radial direction, when the base portion is fitted into the case, the seal portion elastically deforms in the radial direction.

* * * * *